United States Patent [19]
Sakamoto et al.

[11] Patent Number: 5,691,833
[45] Date of Patent: Nov. 25, 1997

[54] ROTARY POLYGON MIRROR DEVICE

[75] Inventors: Junshin Sakamoto; Susumu Saito, both of Ibaraki, Japan

[73] Assignee: Hitachi Koki Co., Ltd., Tokyo, Japan

[21] Appl. No.: 698,152

[22] Filed: Aug. 7, 1996

[30] Foreign Application Priority Data

Aug. 18, 1995 [JP] Japan .................... 7-210804

[51] Int. Cl.⁶ .................................. G02B 26/08
[52] U.S. Cl. ............. 359/200; 359/198; 359/216; 384/107
[58] Field of Search ................... 359/198–200, 359/216–219; 310/90; 384/99, 100, 107–109, 114, 121, 368, 397

[56] References Cited

U.S. PATENT DOCUMENTS

| 4,934,836 | 6/1990 | Tanaka et al. | 359/200 |
| 5,434,695 | 7/1995 | Saito et al. | 359/200 |

Primary Examiner—James Phan
Attorney, Agent, or Firm—Sughrue,Mion,Zinn,Macpeak & Seas, PLLC

[57] ABSTRACT

In a rotary polygon mirror device comprising a cylinder rotatably supported for holding a polygon mirror and a casing over the outer peripheral surface of said cylinder through a predetermined gap, the thermal expansion coefficient of said casing is set for 1.2–1.6 times as large as that of said cylinder.

4 Claims, 1 Drawing Sheet

ROTARY POLYGON MIRROR DEVICE

BACKGROUND OF THE INVENTION

1. Field of the Invention

The present invention relates to a rotating polygon mirror device.

2. Description of the Related Art

Generally, a rotary polygon mirror in which a polygon with mirror-finished sides is attached to a rotor in a motor for rotary driving is rotated at a high speed of several tens of thousands of revolutions per minute (rpm). A ball bearing, fluid bearing or a combination of the fluid bearing and a magnetic bearing have been used as the bearing for holding the rotary polygon mirror rotating at such a high speed.

The ball bearing can implement stabilized rotation as long as the rotary polygon mirror has a rotating speed up to 15000 rpm. But, for a rotating speed range of 15000 rpm or more, the fluid bearing using air and magnetic fluid or a combined bearing of the fluid bearing and the magnetic bearing rather than the ball bearing can implement the stabilized rotation.

For example, in the rotary polygon mirror used for an optical scanning device for an image recording device such as a copier, laser printer, etc., the high speed rotating region of 48000 rpm or more has been used. For this reason, the fluid bearing and a combined bearing of the fluid bearing and a magnetic bearing have been mainly adopted. But, a problem relative to the high speed revolution of the polygon mirror, e.g. size variation of the bearing due to a temperature rise resulting from the high speed revolution of the polygon mirror, is not taken into consideration. Thus, realization of the rotating polygon mirror device suited to high speed revolution has been demanded.

SUMMARY OF THE INVENTION

The present invention has been made in view of the above circumstances, and therefore an object of the present invention is to provide a rotary polygon mirror device which can operate at a high speed revolution, is simple in structure and non-expensive in cost.

The above object of the present invention can be attained by a rotary polygon mirror device comprising a cylinder rotatably supported for holding a polygon mirror and a casing over the outer peripheral surface of said cylinder through a predetermined gap, setting the thermal expansion coefficient of said casing at 1.2–1.6 times as large as that of said cylinder.

In the rotary polygon mirror device having the above structure, a constant bearing gap is always held even when the temperature of the bearing and cylinder (rotary body) change. When the mirror device rotates at a high speed, the bearing and rotary body can be cooled effectively, thus realizing its stabilized operation for a long time.

The above and other objects and features of the present invention will be more apparent from the following description taken in conjunction with the accompanying drawings.

DETAILED DESCRIPTION OF THE PREFERRED EMBODIMENTS

Now, a description will be given in more detail of an embodiment of the present invention with reference to the accompanying drawing.

Figure 1:
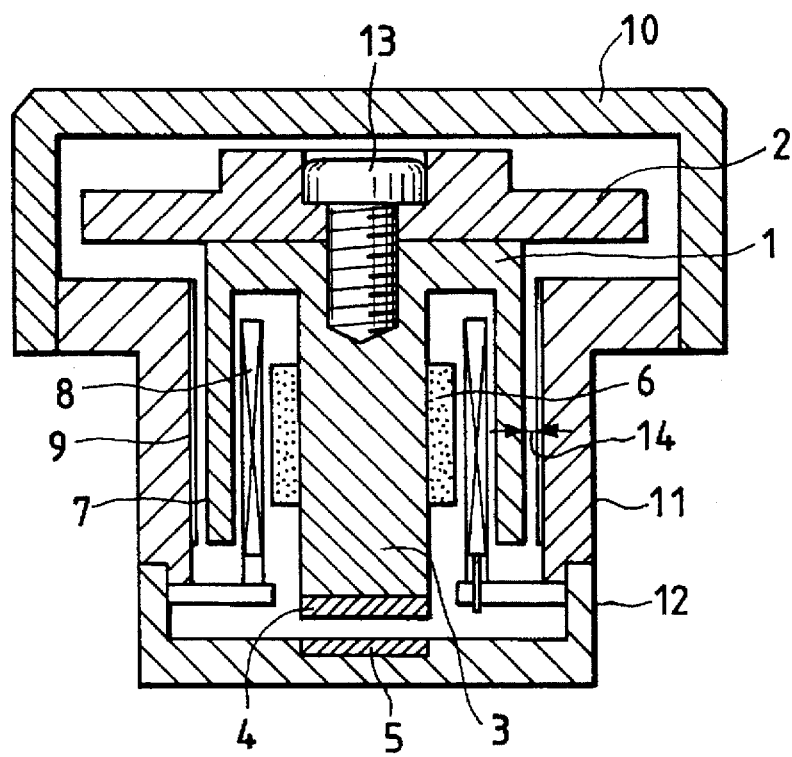
FIG. 1 is a longitudinal cross-sectional view showing a rotary polygon mirror device according to one embodiment of the present invention.

FIG. 1 is a longitudinal sectional-view showing a rotary polygon mirror according to an embodiment of the present invention. At one end of a rotary cylinder body 1, a regular polyhedron with mirror-finished sides is attached by a screw 13. At the inner central portion of the cylinder 1, a rod body 3 is integrally formed. On the side of the rod 3, a magnet 6 for a motor is attached and to the end surface thereof, a permanent magnet 4 is attached. The entire rotary cylinder 1 is covered with a casing including a head cover 10, a side case 11 and an end case 12. Although not shown, the head cover 10 has a window for emitting/receiving an optical beam located at a suitable position. A core-less stator coil 8 is fixed to the end case 12. The core-less stator coil 8 is opposite to a motor magnet 6 within a rotary cylinder 1 concentrically and with no contact, thus constituting a motor section for rotary driving.

Figure 2:
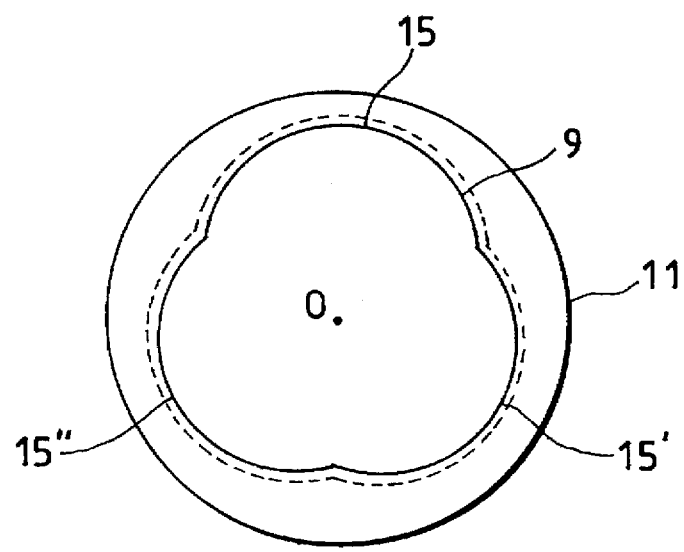
FIG. 2 is a transverse cross-sectional view showing a bearing of the rotary polygon mirror device according to the embodiment of the invention.

In the neighborhood of the end case 12, a permanent magnet 5 is provided. The permanent magnets 5 and 4 are arranged with their same magnetic poles opposite to each other so that they repel each other, thus constituting a thrust bearing. The inner surface of the side case 11 is located away from the side 7 of the cylinder 1 by a minute gap of 10–100 μm. Against the cylindrical surface of the rotary cylinder 1, the inner surface of the side case 11 has a shape consisting of plural curves 15, 15' and 15" connected as shown in FIG. 2, thus forming a dynamic pressure radial axis capable of giving a stabilized and high bearing stiffness for rotation. In contrast, the cylindrical surface of the rotary cylinder 1 may have plural chained curves to provide the same effect. Thus, the rotary polygon mirror device is constituted. In this specification, the curves are defined by three arcs 15, 15' and 15" each having the same curvature.

In constructing the dynamic pressure bearing, the gap 14 between the bearing and the bearing receiving surface is critical. It has an optimum value which permits stabilized rotation to be made according to the size of the bearing and rotating speed. In the high speed rotation, because of the wind loss of the polygon mirror body, loss of the bearing, copper loss of the motor section, the rotary cylindrical body 1 and the side case 11 will create very great heat. Particularly, the rotary cylindrical body 1 exhibits a higher temperature rise than the side case 11 does. This is because the wind loss of the polygon mirror body and the loss of the bearing, which occupy a greater proportion of the whole loss, are generated in the rotary cylinder 1. The rotary cylinder 1, which rotates with no contact, can be cooled only through air and the side case 11. For example, at the rotation of 40,000 rpm, the temperature difference between the side case 11 and the rotary cylinder 1 is increased to 20°–30° C. With such a temperature difference, if the rotary cylinder 1 and the side case 11 are made of the same material, the gap 14 is narrowed so that abnormal vibration may be produced and as the case may be, they may be brought into contact with each other. Such an inconvenience can be overcome by making the thermal expansion coefficient of the side case 11 larger than that of the rotary cylinder 1. If the thermal expansion coefficient of the side case 11 is too much larger than that of the rotary cylinder 1, however, inversely the gap 14 is extended excessively, thus giving rise to the reduction in the dynamic pressure of the bearing.

The result of experiments shows that in a range of 20,000–50,000 rpm, the thermal expansion coefficient of the side case 11 is preferably 1.2–1.6 times, particularly 1.4–1.5 times as large as that of that of the rotary cylinder body 1. Further, it is desirable that at least one of the outer surface of the rotary cylinder 1 and the inner surface of the side case 11 has an abrasion-resistant layer in order to prevent the abrasion of the bearing surface due to contact in starting and stopping of rotation. For this purpose, in this embodiment, a polyimide resin layer is formed on the inner surface 9 of the side case 11. Further, in order to prevent the formation of rust, the surface of the rotary cylinder 1 may be plated with nickel or chrome. Moreover, other abrasion resistant resin such as fluorine resin may be adopted in place of the polyimide resin in this embodiment. In the experiment, the cylinder made of steel and the casing made of stainless steel were used.

In accordance with the present invention, the gap relative to the bearing can be stably held against changes in temperature so that a rotary polygon mirror device can be provided which can operate stably when it rotates at a high speed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A rotary polygon mirror device comprising:

a polygon mirror;

a rotatable cylinder for holding said polygon mirror; and a casing, disposed around an outer peripheral surface of said rotatable cylinder, for forming a predetermined gap between said outer peripheral surface of said rotatable cylinder and an inner peripheral surface of said casing;

wherein the thermal expansion coefficient of said casing is 1.2–1.6 times as large as that of said rotatable cylinder and said rotatable cylinder is used in the rotating region of at least 20,000 revolutions per minute.

2. A rotary polygon mirror device according to claim 1, wherein said gap comprises a radial bearing.

3. A rotary polygon mirror device according to claim 1, wherein at least one of the outer peripheral surface of said rotatable cylinder and the inner peripheral surface of said casing has an abrasion-resistant resin layer.

4. A rotary polygon mirror device according to claim 3, wherein the surface structure of said abrasion-resistant resin layer includes a plurality of connected curved faces.

* * * * *